(12) United States Patent
Terajima (10) Patent No.: US 9,810,919 B2
(45) Date of Patent: Nov. 7, 2017

(54) LENS DRIVING DEVICE WITH IMPROVED SUSPENSION SUPPORT

(71) Applicants: Huizhou Dayawan Ever Bright Electronic Industry Co., Ltd., Huizhou (CN); JSS Optical Technology Co., Ltd., Hong Kong (HK); Huizhou Daya Bay Jss Optical Technology.Co., Ltd., Huizhou (CN)

(72) Inventor: Kokichi Terajima, Tokyo (JP)

(73) Assignees: HUIZHOU DAYAWAN EVER BRIGHT ELECTRONIC INDUSTRY CO, Huizhou (CN); JSS OPTICAL TECHNOLOGY CO., LTD., Hong Kong (HK); HUIZHOU DAYA BAY JSS OPTICAL TECHNOLOGY, CO., LTD., Huizhou (CN)

( * ) Notice: Subject to any disclaimer, the term of this patent is extended or adjusted under 35 U.S.C. 154(b) by 13 days.

(21) Appl. No.: 15/075,106

(22) Filed: Mar. 19, 2016

(65) Prior Publication Data

US 2016/0291344 A1 Oct. 6, 2016

(30) Foreign Application Priority Data

Mar. 30, 2015 (JP) ................. 2015-069870

(51) Int. Cl.
*G02B 27/64* (2006.01)
*G02B 7/04* (2006.01)
(Continued)

(52) U.S. Cl.
CPC ............ *G02B 27/646* (2013.01); *G02B 7/026* (2013.01); *G02B 7/04* (2013.01); *G03B 3/10* (2013.01);
(Continued)

(58) Field of Classification Search
CPC ........ G02B 7/04; G02B 27/64; G02B 27/646; H04N 5/23248; H04N 5/23264; H04N 5/2328; H04N 5/23287
(Continued)

(56) References Cited

U.S. PATENT DOCUMENTS 9,523,861 B2 12/2016 Terajima
2015/0365568 A1* 12/2015 Topliss ..................... G02B 7/08
348/360

FOREIGN PATENT DOCUMENTS

CN 202383344 U 8/2012
CN 103969916 A 8/2014

OTHER PUBLICATIONS

SIPO, Search Report and Notification of First Office Action, App. No. 201610001378.2.

* cited by examiner

Primary Examiner — Arnel C Lavarias
(74) Attorney, Agent, or Firm — Hemispher Law, PLLC (57) ABSTRACT

A lens driving device includes a lens carrier for maintaining a lens, a base for supporting the lens carrier, an first electromagnetic drive mechanism and an second electromagnetic drive mechanism which are mounted between the lens carrier and the base, and a front side spring component and a back side spring component which are connected with each other through connecting components. One of the front and back side spring components is connected with the lens carrier, the other of which is connected with the base. The lens driving device is difficult to damage when suffering from external force and is capable of playing the auto focus and shaking functions correction stably.

5 Claims, 10 Drawing Sheets

(51) Int. Cl.
*G02B 7/02* (2006.01)
*G03B 13/36* (2006.01)
*G03B 5/06* (2006.01)
*G03B 3/10* (2006.01)
*G03B 29/00* (2006.01)
*H04N 5/225* (2006.01)
*H04M 1/02* (2006.01)

(52) U.S. Cl.
CPC ............... *G03B 5/06* (2013.01); *G03B 13/36* (2013.01); *G03B 29/00* (2013.01); *H04M 1/0264* (2013.01); *H04N 5/2254* (2013.01)

(58) Field of Classification Search
USPC ....... 359/554, 557; 250/201.1, 201.2, 201.4; 348/208.99, 208.4, 208.7, 208.11
See application file for complete search history.

LENS DRIVING DEVICE WITH IMPROVED SUSPENSION SUPPORT

BACKGROUND OF THE INVENTION

1. Field of the Invention

The present invention relates to a lens driving device which has an auto focus function and a shaking correction function and is applied to cameras for mobile phones.

2. Description of Related Art

A lens driving device with the functions of auto focus and shaking (unintentional movement) correction (hereafter called lens driving device) is composed of the following components: an auto focus unit which enables a lens loaded in a camera to move forward, move backward or focus towards an object to be shot positioned in front of the lens and a shaking correction unit for inhibiting a shot image from generating drifting due to shaking.

For example, the Japanese patent application No. P2011-65140A (publication date Mar. 31, 2011) discloses a lens driving device with the functions of auto focus and shaking correction, namely an auto focus unit enables a lens maintained on a lens carrier to move along a focus direction, and a shaking correction unit enables the auto focus unit to swing in directions forming a right angle with an optical axis (the focus direction), so that the image generated on an image sensor is inhibited from shifting. Moreover, the optical axis direction of the lens is set to be Z direction (Z side), the side of the object to be shot is set to be the front of the Z direction (+Z side), and the two directions which form a right angle with the Z direction and are mutually orthogonal are set to be X direction and Y direction.

Figure 6A:
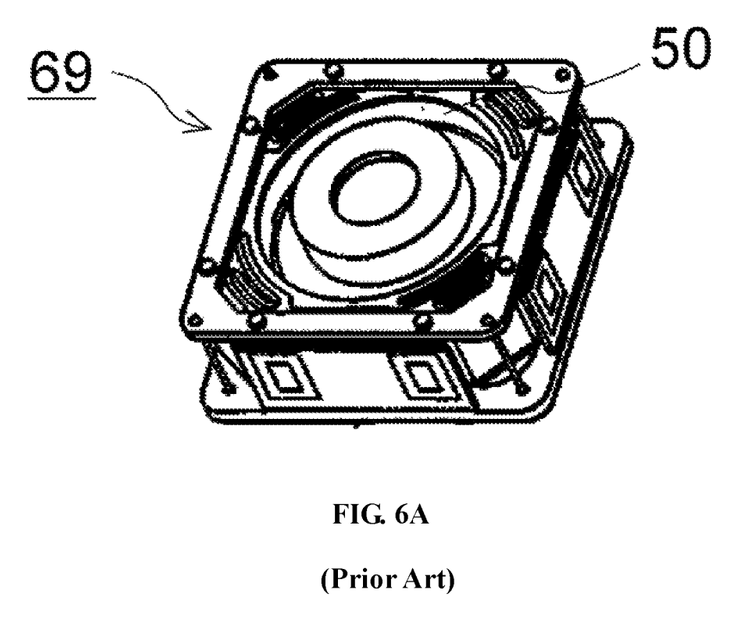
FIG. 6A and FIG. 6B are perspective view and exploded view of an existing lens driving device.
Figure 6B:
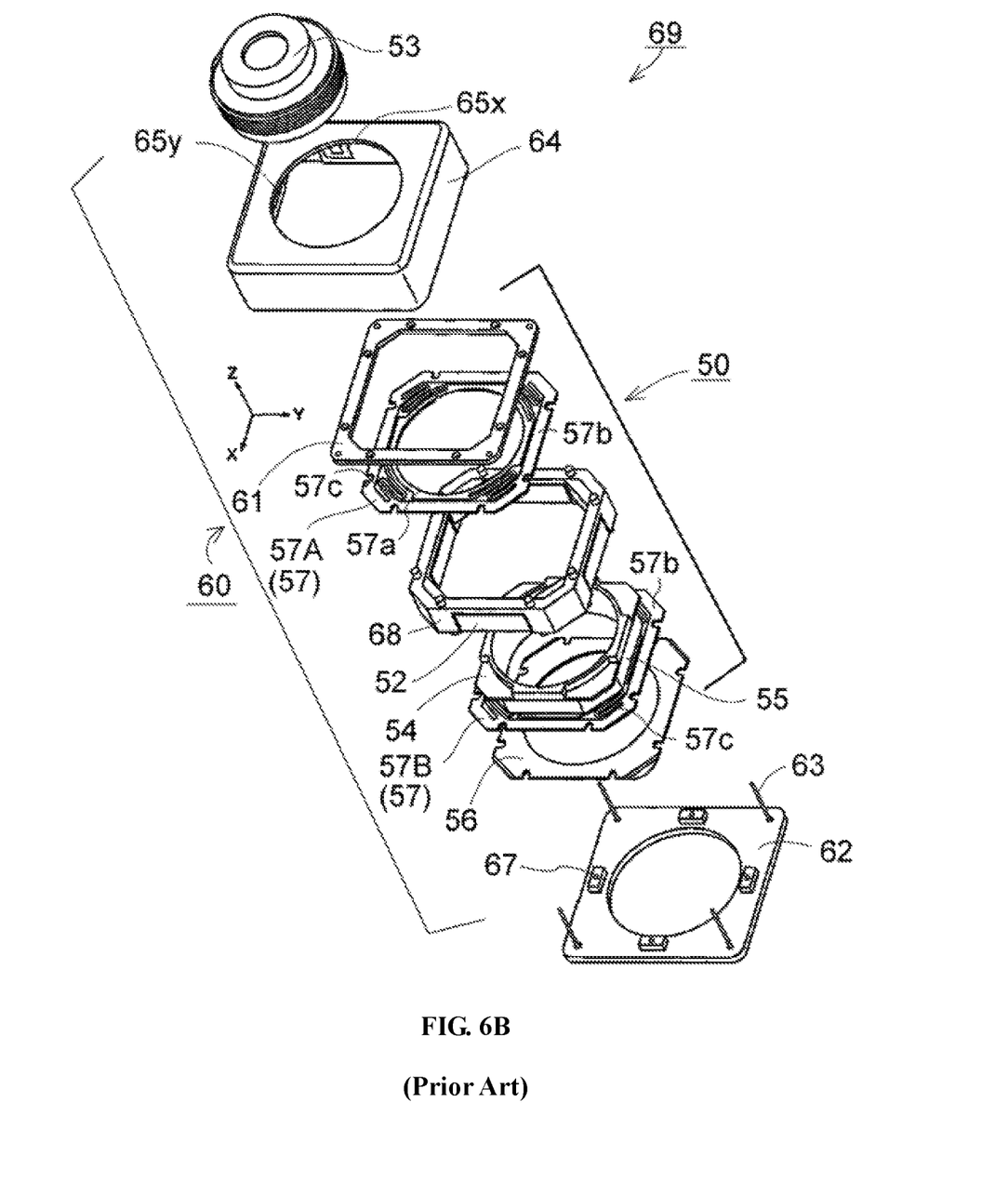

As shown in FIG. 6A and FIG. 6B, the lens driving device 69 includes the auto focus unit 50 and the shaking correction unit 60. The auto focus unit 50 is composed of the lens carrier 54 for maintaining the lens 53, a coil 55 for focus, a magnet support 68, four magnets 52, two spring components 57 and a base 56 for focus.

The coil 55 formed in the shape of an octagonal ring is wound around the Z direction (axis) and are mounted on the lens carrier 54. Each magnet 52 is formed in the shape of a square plate, and a plurality of magnets 52 are annularly configured on the outer side in the radial direction of the coil 55 at 90-degree intervals along the X side and the Y side respectively. The magnets 52 are arranged opposite to the coil 55 at intervals along the radial direction. The magnet support 68 is formed in the shape of an octagonal frame and is used for maintaining the magnets 52.

The spring components 57 are composed of a front side spring component 57A and a back side spring component 57B. The front side spring component 57A and the back side spring component 57B are plate springs extending along the X direction and the Y direction.

Each of the front side spring component 57A and the back side spring component 57B includes an inner side maintaining part 57a (unshown on the back side spring component 57B), an outer side maintaining part 57b and a wrist part 57c. The inner side maintaining parts 57a are circularly formed on the inner peripheral sides of the front side spring component 57A and the back side spring component 57B. Moreover, the outer side maintaining parts 57b are squarely formed on the outer peripheral sides of the front side spring component 57A and the back side spring component 57B. Moreover, each wrist part 57c extends along the peripheral direction and the radial direction alternately in a zigzag manner, one end of each wrist part is connected with a corresponding inner side maintaining part 57a, and the other end of each wrist part is connected with a corresponding outer side maintaining part 57b.

The inner side maintaining part 57a of the front side spring component 57A is connected with the front side end part of the lens carrier 54, and the outer side maintaining part 57b of the front side spring component 57A is connected with the front side end part of the magnet support 68. The inner side maintaining part 57a of the back side spring component 57B is connected with the back side end part of the lens carrier 54, and the outer side maintaining part 57b of the back side spring component 57B is clamped between the back side end part of the magnet support 68 and the base for focus 56.

The shaking correction unit 60 is composed of a frame 61, a base 62 for swinging the lens, four suspension wires 63, a shielding box 64 and coils 65x, 65y for swinging the lens. The frame 61 is formed in the shape of a square frame, is configured in front of the auto focus unit 50, and is connected with the magnet support 68. The base 62 is formed in the shape of a square plate, a circular opening is defined in the central part of the base 62, and the base 62 is configured at the back of the auto focus unit 50 at an interval.

The suspension wires 63 extends along the Z direction, one end of the suspension wires 63 is connected with the frame 61, and the other end of the suspension wires 63 is connected with the base 62, so that the auto focus unit 50 can be supported in a swing and suspension manner in the X direction and the Y direction.

The circular opening is formed in the front surface of the shielding box 64 which wraps the outer side and the front side of the auto focus unit 50 in the radial direction. The coil 65x and the coil 65y are mounted on the inner side of the side walls of the shielding box 64. The coil 65x is wound around the X direction (axis) and is mounted on the inner side of the X-side-side wall of the shielding box 64, and the coil 65x and the magnets 52 are arranged opposite to each other at intervals along the radial direction. Moreover, the coil 65y is wound around the Y direction (axis) and is mounted on the inner side of the Y-side-side wall of the Y side of the shielding box 64, and the coil 65y and the magnets 52 are arranged opposite to each other at intervals along the radial direction.

Thus, the magnets 52 and the coil 55 are combined so as to form a drive mechanism for the auto focus unit 50. Moreover, the magnets 52 are combined with the coils 65x, 65y so as to form a drive mechanism for the shaking correction unit 60. In other words, the magnets 52 play two roles of focus and shaking correction.

And then, along with the inflow of current for focus, under the action of a magnetic field applied by the magnets 52, lorentz force is generated along the Z direction by the coil 55. As a result, the lens carrier 54 supported on the spring components 57 in a suspension manner moves towards the Z direction.

Moreover, along with the inflow of current for shaking correction, under the action of the magnetic field applied by the magnets 52, lorentz force is generated along the Y direction and the X direction by the coil 65x and the coil 65y, and counter-acting force is generated by the magnets 52 in response to the lorentz force. As a result, the magnets 52 enable the auto focus unit 50 to swing in a direction opposite to the lorentz force generated by the coil 65x and the coil 65y.

Moreover, a position sensor 67 is mounted on a base 62 positioned at the back of the magnets 52 in the Z direction. When a shake/shakes happens, the position sensor 67 measures a distance that the shaking correction unit 60 swings in the direction forming the right angle with the Z axis.

The lens driving device 69 can play the role of shaking correction just by utilizing the simple structure of the auto focus unit 50 suspended by the suspension wires 63. Moreover, the lens driving device also has the advantage of easy assembly.

However, in the lens driving device 69, the suspension wires 63 need to directly support the auto focus unit 50 formed by overlapping the lens 53, the lens carrier 54, the coil 55, the magnet support 68, the magnets 52, the spring components 57 and the base 56. Therefore, when the lens driving device suffers from external force such as impact force in the Z direction, the impact force can be transmitted onto the auto focus unit 50 or the suspension wires 63; after the suspension wires 63 suffers from the impact, the problem that breakage or buckling damages the function of the shaking correction unit 60 may appear due to the fact that the tension or compressing force cannot be alleviated.

BRIEF SUMMARY OF THE INVENTION

The present invention aims to provide a lens driving device which is difficult to be damaged when suffering from external force such as impact and is capable of stably playing the roles of auto focus and shaking correction.

The lens driving device of the present invention includes a lens carrier configured for maintaining a lens, a base configured for supporting the lens carrier, a first electromagnetic drive mechanism configure for driving the lens to focus on an object to be shot, a second electromagnetic drive mechanism configured for swinging the lens, and a front side spring component and a back side spring component both extending along a peripheral direction of the lens. The first electromagnetic drive mechanism and the second electromagnetic drive mechanism are mounted between the lens carrier and the base. One of the front side spring component and the back side spring component is connected with the lens carrier, the other of the front side spring component and the back side spring component is connected with the base, and the front side spring component and the back side spring component are connected with each other through a plurality of connecting components.

Thus, one of the front side spring component and the back side spring component is connected with the lens carrier which is movable with respect to the side of the base, the other of the front side spring component and the back side spring component is connected with the base. The front side spring component and the back side spring component are connected with each other through several connecting components, so that the front side spring component and the back side spring component can elastically deform with a certain margin so as to alleviate the impact force even if suffering from the impact force. Therefore, the front side spring component and the back side spring component are difficult to damage and can stably maintain the functions of auto focus and shaking correction.

Moreover, as an example of the present invention, first electromagnetic drive mechanism comprises a focus coil configured on a side of the base and a plurality of first magnets configured on a side of the lens carrier which is movable with respect to the side of the base; the second electromagnetic drive mechanism comprises a plurality of coils configured for swinging the lens and mounted on the side of the base and a plurality of second magnets also configured on the side of the lens carrier.

Thus, the first magnets are mounted on the side of the lens carrier, and the focus coil is mounted on the side of the base, so that the lens carrier can move towards the optical axis direction of the lens; and moreover, the coils for swinging the lens are mounted on the side of the base, and the second magnets are mounted on the side of the lens carrier, so that the lens carrier can straightly swing towards directions forming the right angle with the optical axis of the lens.

Moreover, as anther example of the present invention, the first magnets can also serve as the second magnets.

Thus, the first magnets can also be used for driving swing, so that the lens driving device can be miniaturized, and the component cost is also reduced.

Moreover, as a further example of the present invention, first electromagnetic drive mechanism and the second electromagnetic drive mechanism comprise a plurality of driving coils mounted on a side of the lens carrier which is movable with respect to the side of the base and a plurality of driving magnets mounted on a side of the base.

Thus, the driving coils are mounted on the side of the lens carrier, and the driving magnets are mounted on the side of the base, so that the lens carrier can move towards the optical axis direction of the lens, and the lens carrier can also rotate and swing towards the direction forming the right angle with the axis of the lens. And then, the driving coils and the driving magnets simultaneously play the roles of auto focus and shaking correction, so that the lens driving device can be small in size and light in weight, and the component cost is also reduced.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The invention will now be described in detail through several embodiments with reference to the accompanying drawings.

Figure 1A:
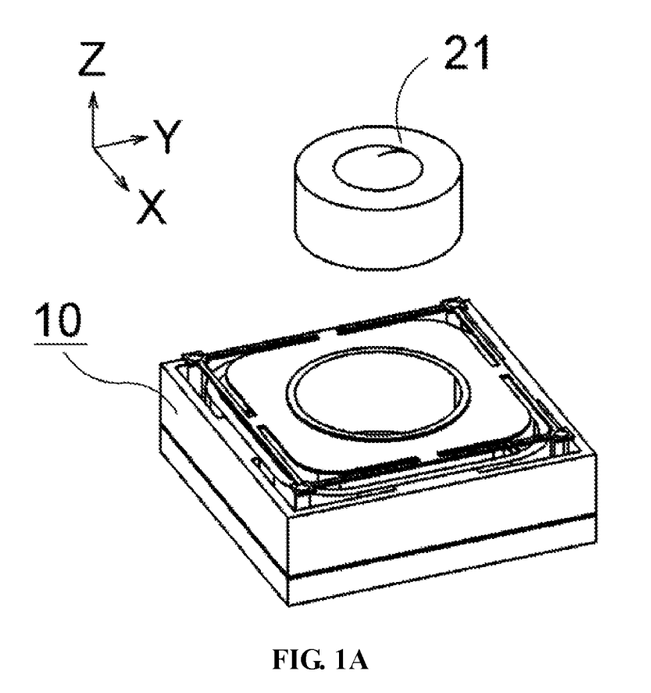
FIG. 1A is a perspective view illustrating a lens driving device and a lens in accordance with a first embodiment of the present invention.
Figure 1B:
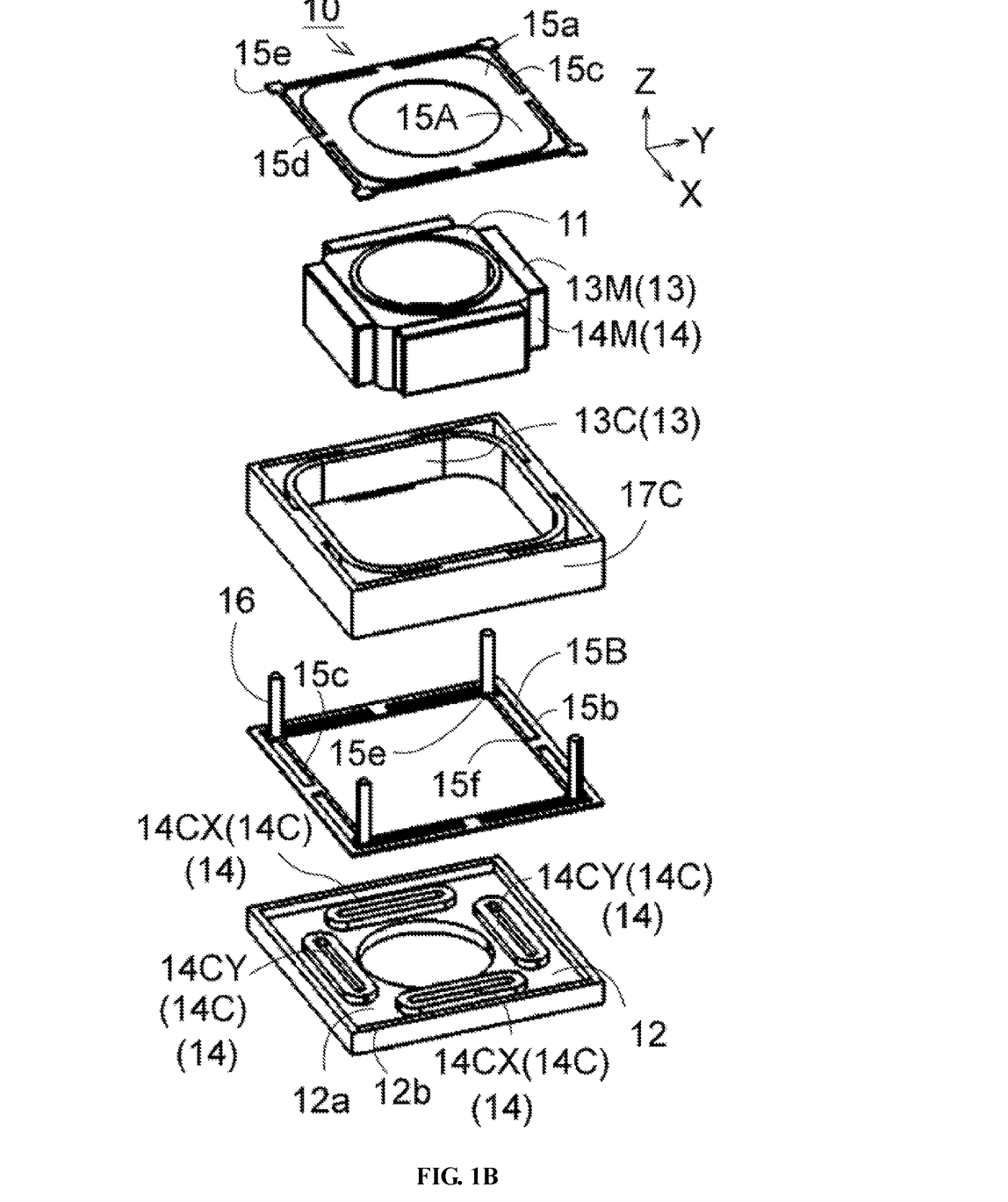
FIG. 1B is an exploded view of the lens driving device in FIG. 1A.
Figure 1C:
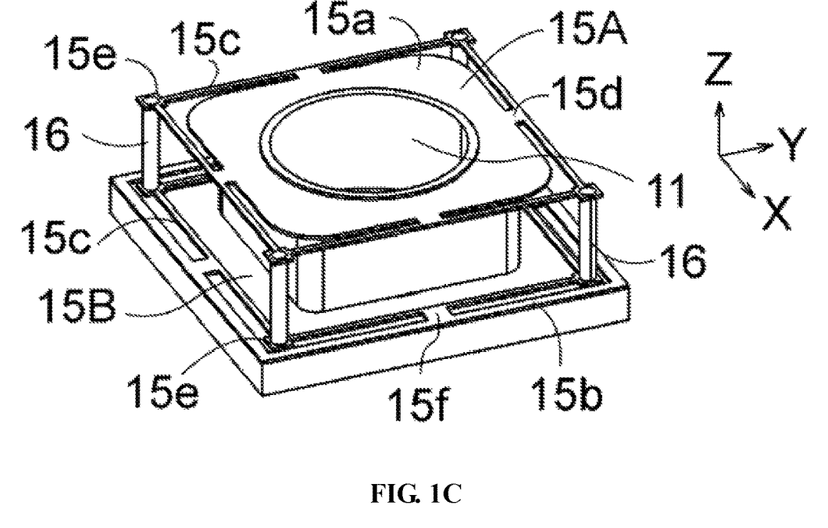
FIG. 1C is a perspective view of main parts of the lens driving device in FIG. 1A.
Figure 2A:
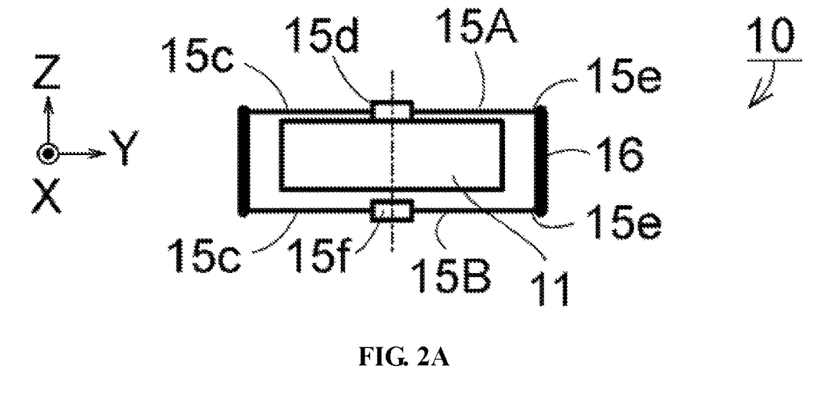
FIG. 2A, FIG. 2B and FIG. 2C are mode patterns for illustrating the actions of the lens driving device in the first embodiment.
Figure 2B:
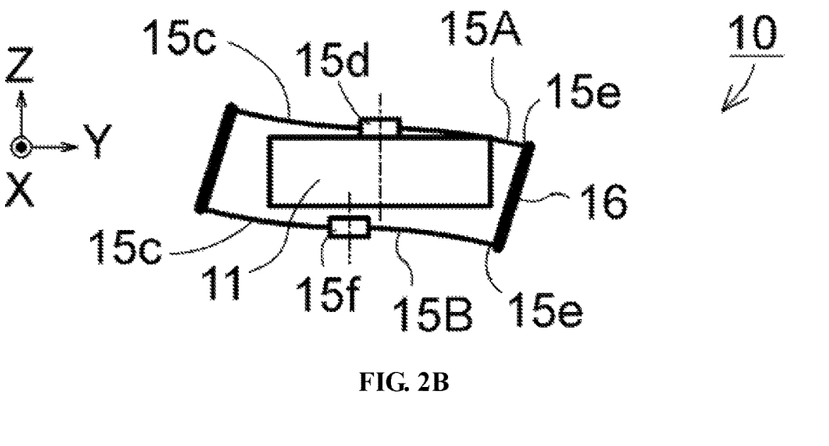
Figure 2C:
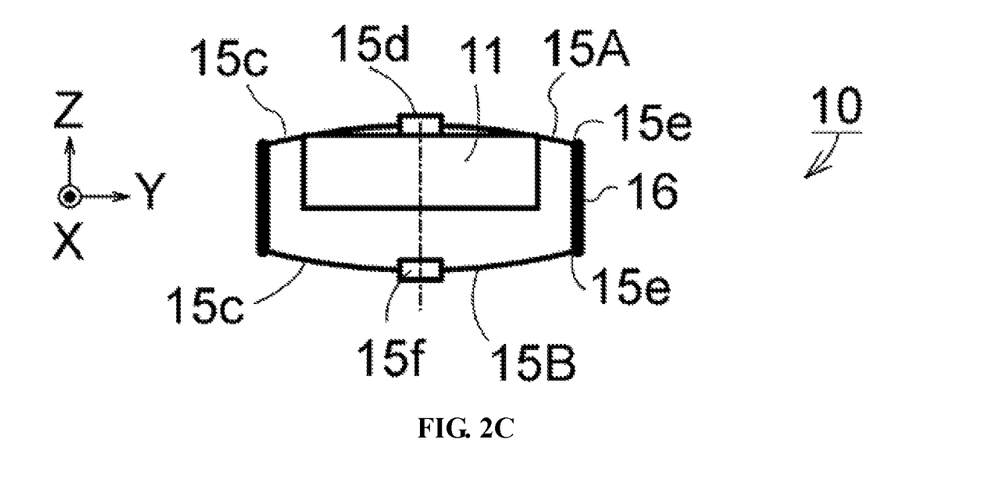

FIG. 1A is a perspective view of a lens driving device 10 with the functions of auto focus and shaking correction in a first embodiment of the present invention. FIG. 1B is an exploded view of the lens driving device 10, and FIG. 1C is a perspective view of main parts of the lens driving device 10. FIG. 2A to FIG. 2C are mode patterns for illustrating the action of the lens driving device 10. Moreover, particularly, FIG. 2A is a diagram illustrating the state before the operation (initial state) of the lens driving device 10, FIG. 2B is a diagram when the lens driving device 10 is observed from the X side to swing towards the Y direction, and FIG. 2C is a diagram when the lens driving device 10 is observed from the X side to swing towards the Z direction.

Hereinafter, the optical axis direction of the lens 21 is set to be Z axis direction (Z direction or Z side), the side of an object to be shot is set to be the front of Z direction (+Z side), and the two directions which are orthogonal with the Z axis direction respectively and orthogonal to each other are set to be X axis direction (X direction or X side) and Y axis direction (Y direction or Y side).

As shown in FIG. 1A, the lens driving device 10 is formed in the shape of a cuboid in appearance, and the lens 21 is mounted at the central part of the lens driving device 10.

The lens driving device 10 includes a lens carrier 11, a base 12, an electromagnetic drive mechanism 13 for driving the lens carrier 11 (or the lens) to focus on the object to be shot, an electromagnetic drive mechanism 14 for swinging the lens carrier 11 (or the lens), a front side spring component 15A, a back side spring component 15B and connecting components 16. The lens carrier 11 is formed to be quadrangular, and a cylindrical opening is defined in the central part of the lens carrier 11 along the Z direction.

The electromagnetic drive mechanism 13 includes a square ring-shaped focus coil 13C and four cuboid-shaped magnets 13M. And then, the magnets 13M are mounted on the outer peripheral side of the lens carrier 11. The coil 13C is arranged on the outer sides of the magnets 13M in radial direction. The coil 13C and the magnets 13M are isolated along the radial direction and are arranged opposite to each other.

The electromagnetic drive mechanism 14 includes four coils 14C and four magnets 14M. Hereon, the magnets 14M are the magnets 13M, that is, the magnets 14M and the magnets 13M are the same components. Namely, the magnets are both served as the magnets 14M and the magnets 13M. The coils 14C include two X side driving coils 14CX and two Y side driving coils 14CY which are all annular plate-shaped. The coils 14C are mounted on a mounting surface 12a of the base 12, and the coils 14C and the side surfaces of the magnets 13M on the −Z side are isolated along the Z direction and are arranged opposite to each other.

The coil 13C is formed in the shape of a square ring, and is maintained on the inner side of a coil support 17C. The back side end part (−Z side end part) of the coil support 17C is connected with the edge part 12b of the base. The front side spring component 15A is arranged on the +Z side of the lens carrier 11, and the back side spring component 15B is arranged on the −Z side of the lens carrier 11.

The front side spring component 15A is integrally formed in the shape of a square frame, and includes a square inner side maintaining part 15a with a circular opening defined in the central part, a plurality of (four in the embodiment) linear wrist parts 15c which extend along the X direction and the Y direction respectively and are formed on the outer side of the inner side maintaining part 15a, a plurality of (four in the embodiment) first connecting parts 15d for connecting the wrist parts 15c with the inner side maintaining part 15a at the central part of each wrist part, and a plurality of (four in the embodiment) second connecting parts 15e for connecting the end parts of the wrist parts 15c at four corners of the front side spring component 15A.

The back side spring component 15B is integrally formed in the shape of a square frame, and includes an annular square outer side maintaining part 15b in the shape of a square frame, a plurality of (four in the embodiment) wrist parts 15c which extend along the X direction and the Y direction respectively and are formed on the inner side of the outer side maintaining part 15b, a plurality of (four in the embodiment) third connecting parts 15f for connecting the wrist parts 15c with the outer side maintaining part 15a at the central part of each wrist part, and a plurality of (four in the embodiment) second connecting parts 15e for connecting the end parts of the wrist parts 15c at four corners.

The inner side maintaining part 15a of the front side spring component 15A is connected with the front surface of the lens carrier 11. The outer side maintaining part 15b of the back side spring component 15B is connected with the edge part 12b of the base 12. The second connecting parts 15e of the front side spring component 15A are connected with the second connecting parts 15e of the back side spring component 15B through the connecting components 16. The connecting components 16 are cylindrical (may be linear springs), and there are four connecting components in the embodiment. The connecting components 16 are inserted between the coil 13C and the coil support 17C, and extend along the Z direction at the four corners on the inner peripheral side of the coil support 17C. The front side end parts of the connecting components 16 are connected with the second connecting parts 15e of the front side spring component 15A, and the back side end parts of the connecting components 16 are connected with the second connecting parts 15e of the back side spring component 15B.

As shown in FIG. 1C, the lens carrier 11 is supported on the base 12 in a suspension manner by the wrist parts 15c of the back side spring component 15B and the wrist parts 15c of the front side spring component 15A which are connected with each other through the connecting components 16.

Hereon, for example, when the Y side driving coils 14CY are electrified, lorentz force in the Y direction is generated on the Y side driving coils 14CY, and the Y side driving coils 14CY enable the lens carrier 11 to straightly swing towards the Y direction. Namely, as shown in FIG. 2A, under the initial state that the coil 13C and the coils 14C are not electrified, the second connecting parts 15e of the front side spring component 15A are positioned on the +Z side of the second connecting part 15e of the back side spring component 15B.

And then, as shown in FIG. 2B, when the Y side driving coils 14CY are electrified, counter-acting force corresponding to the lorentz force in the Y direction generated by the Y side driving coils 14CY is generated by the magnets 13M, the second connecting parts 15e of the front side spring component 15A move towards the +Y direction, S-shaped deflection occurs on the wrist parts 15c of the front side spring component 15A and the back side spring component 15B, and the connecting components 16 are inclined in the Y direction, so that the lens carrier 11 straightly swings towards the Y direction. Moreover, similarly, when the X side driving coils 14CX are electrified, the lens carrier 11 straightly swings towards the X direction.

Moreover, as shown in FIG. 2C, when the coil 13C is electrified, counter-acting force corresponding to the lorentz force in the Z direction generated by the coil 13C is generated by the magnets 13M, the second connecting parts 15e of the front side spring component 15A moves towards the +Z direction, and C-shaped deflection occurs on the wrist parts 15c of the front side spring component 15A and the back side spring component 15B, so that the lens carrier 11 straightly moves towards the Z direction.

As mentioned above, in the lens driving device 10 in the first embodiment of the present invention, the wrist parts 15c of the front side spring component 15A and the wrist parts 15c of the back side spring component 15B are connected with each other through the connecting components 16, and the lens carrier 11 which is light in weight due to the fact that loaded components are reduced is supported in the suspension manner by the wrist parts 15c, so that the focus action and swing action can be performed by utilizing the deflection deformation of the wrist parts 15c.

Thus, in the lens driving device 10 in the first embodiment of the present invention, the lens carrier 11 performing the focus action and the swing action is light in weight, and the inertia mass is reduced. In particularly, the lens driving device is no longer needed to swing a whole auto focus unit, like the auto focus unit 50 of the lens driving device 69 as shown in FIG. 6.

Moreover, corresponding to movements or rotations of the lens carrier 11 in the directions of X, Y and Z due to external force, the S-shaped or C-shaped deflection deformation with allowance easily occurs in elastic ranges on the wrist parts 15c of the front side spring component 15A and the back side spring component 15B. Thus, the wrist parts 15c of the front side spring component 15A and the back side spring component 15B elastically deform with allowance and are difficult to suffer from the damage of buckling or breakage, and thus the functions of auto focus and swing can be relatively stable. Moreover, the inertia mass is reduced, and the impact force such as falling is weakened.

Figure 3:
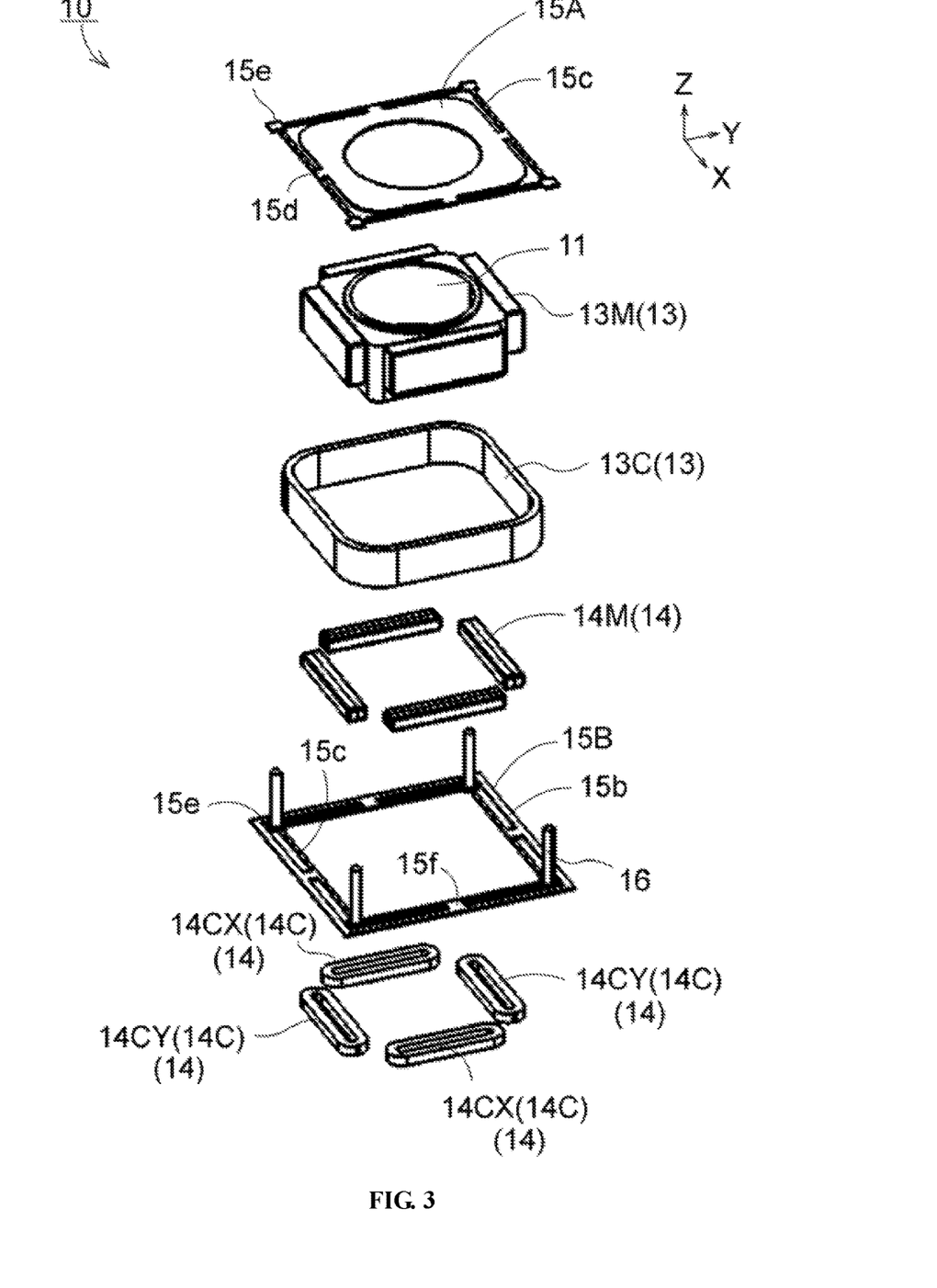
FIG. 3 is an exploded view illustrating another example of the lens driving device in accordance with the first embodiment.

FIG. 3 is an exploded view illustrating an another variation example of the lens driving device 10 in the first embodiment of the present invention. In FIG. 3, the same marks are used to represent the same components as those of the lens driving device 10 in FIG. 1, and a part of the descriptions of the same components are omitted.

The lens driving device 10 is formed in the shape of a cuboid in appearance, and the lens is mounted at the central part of the lens driving device 10. The lens driving device 10 includes a lens carrier 11, an unshown base (which is the same as the base 12 in FIG. 1), an electromagnetic drive mechanism 13, an electromagnetic drive mechanism 14, a front side spring component 15A, a back side spring component 15B and connecting components 16. The lens carrier 11 is formed to be quadrangular, and a cylindrical opening is defined in the central part of the lens carrier 11 along the Z direction.

The electromagnetic drive mechanism 13 includes a driving coil 13C and magnets 13M. The magnets 13M are in the shape of a cuboid, and are mounted on the outer peripheral side of the lens carrier 11. The square ring-shaped coil 13C is arranged on the outer sides of the magnets 13M in radial direction. The coil 13C and the magnets 13M are isolated along the radial direction and are arranged opposite to each other.

The electromagnetic drive mechanism 14 includes coils 14C and magnets 14M. The coils 14C includes two X side coils 14CX and two Y side coils 14CY, each is formed in an annular plate. The coils 14C are mounted on a mounting surface of the unshown base. The magnets 14M are mounted on the −Z side of the lens carrier 11, and are also positioned on the −Z side of the magnets 13M. And then, the coils 14C and the magnets 14M are isolated along the Z direction and are arranged opposite to each other.

The coil 13C is maintained on the inner side of the unshown coil support (which is the same as the coil support 17 in the FIG. 1). Similar to the example in FIG. 1, the back side end part of the coil support is connected with the edge part of the base.

Similar to the example as shown in FIG. 1, the lens carrier 11 is also supported in the suspension manner relative to the unshown base by utilizing the wrist parts 15c of the back side spring component 15B and the wrist parts 15c of the front side spring component 15A which are connected through the connecting components 16.

In the example, when the X side driving coils 14CX are electrified, the lens carrier 11 straightly swings in the X direction, too. When the Y side driving coils 14CY are electrified, the lens carrier 11 straightly swings in the Y direction. Moreover, when the coil 13C is electrified, the lens carrier 11 also straightly moves in the Z direction.

Thus, in another variation example of the lens driving device 10 in the first embodiment of the present invention, the inertia mass is also reduced, and the impact force such as falling is weakened. Moreover, the wrist parts 15c of the front side spring component 15A and the wrist parts 15c of the back side spring component 15B elastically deform with allowance and are difficult to suffer from the damage of buckling or breakage, and thus the functions of auto focus and swing can be relatively stable.

Figure 4A:
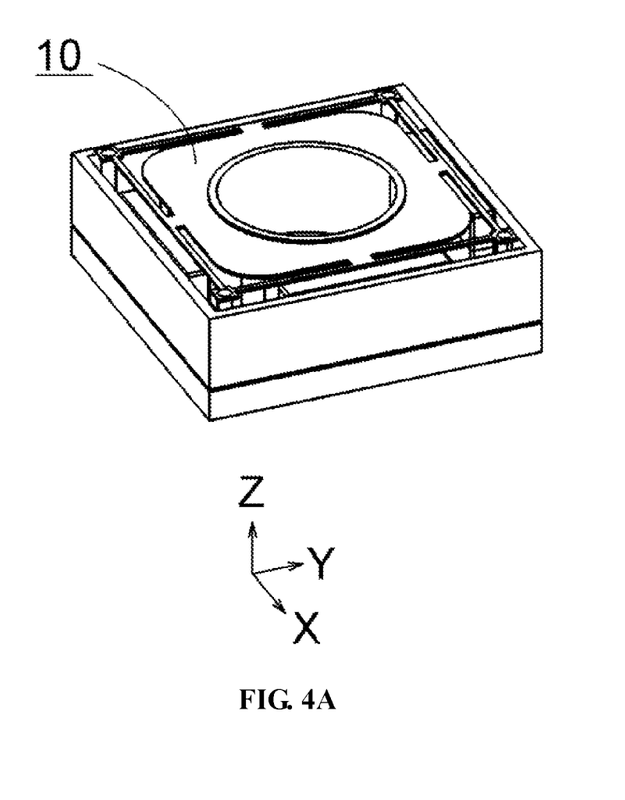
FIG. 4A and FIG. 4B are perspective view and exploded view illustrating the lens driving device in accordance with a second embodiment of the present invention.
Figure 4B:
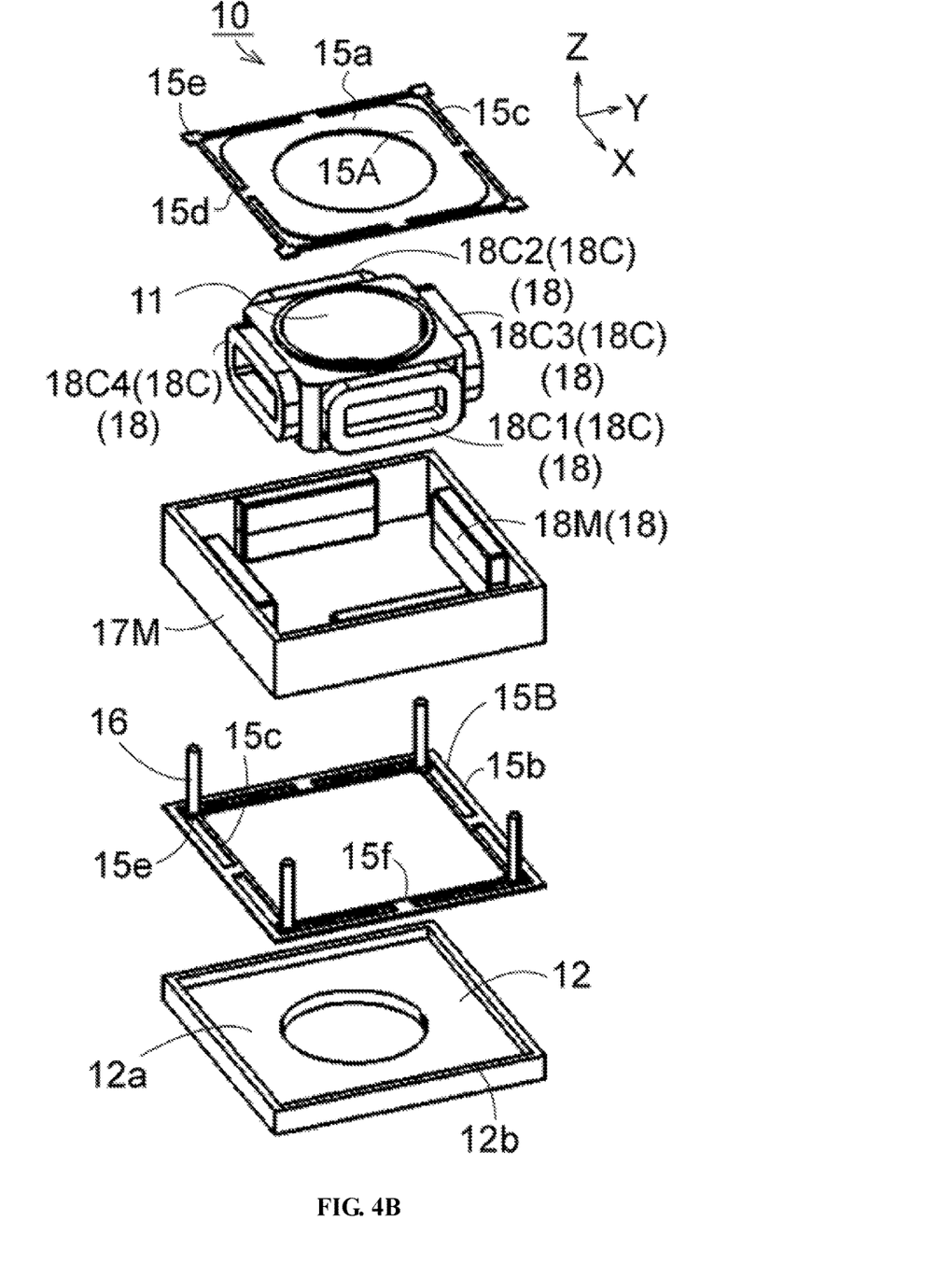
Figure 5A:
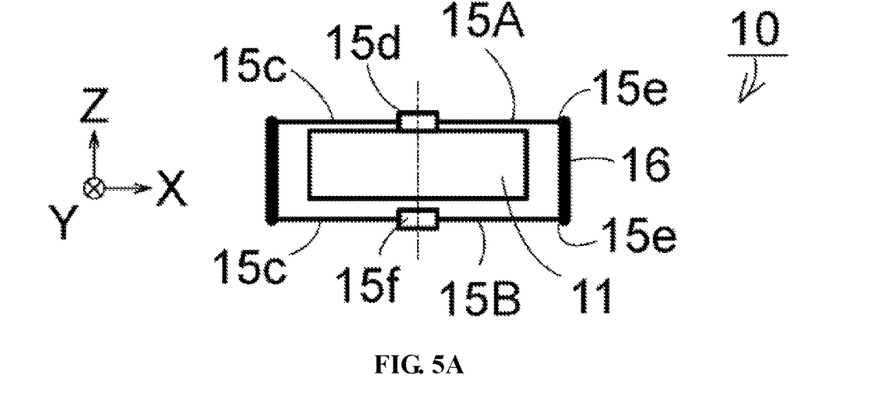
FIG. 5A, FIG. 5B, and FIG. 5C are mode patterns for illustrating the actions of the lens driving device in the second embodiment.
Figure 5B:
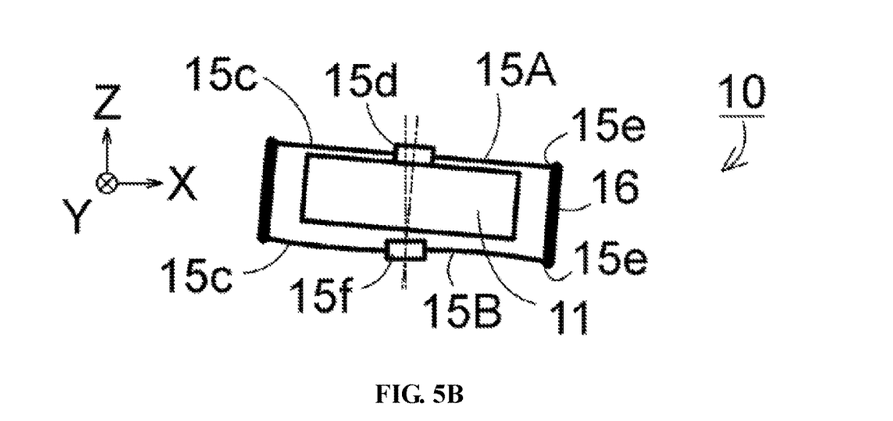
Figure 5C:
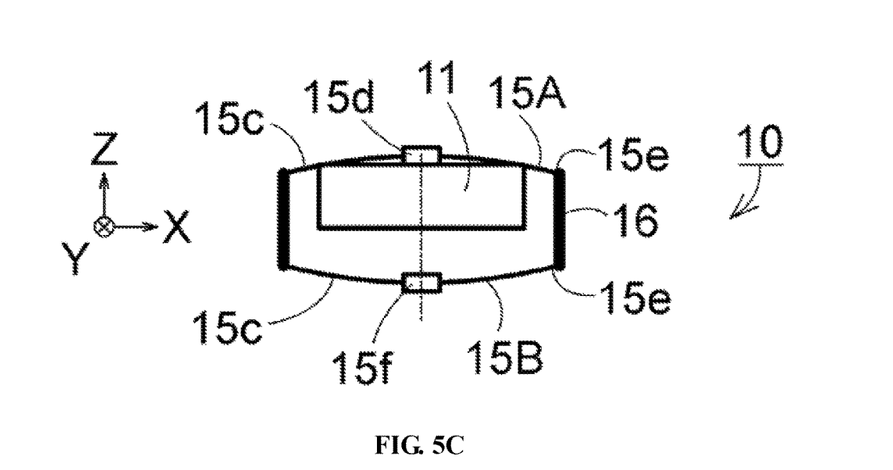

FIG. 4A is a perspective view of the lens driving device 10 in a second embodiment of the present invention, and FIG. 4B is an exploded view of the lens driving device 10. FIG. 5A to FIG. 5C are action mode patterns for illustrating the lens driving device 10 in the second embodiment of the present invention. FIG. 5A is a diagram illustrating the state before operation (initial state) of the lens driving device 10. FIG. 5B is a diagram when the lens driving device 10 in the second embodiment of the present invention is observed from the Y side to swing and operate in the X direction. FIG. 5C is a diagram when the lens driving device 10 in the second embodiment is observed from the Y side to swing and operate in the Z direction.

As shown in FIG. 4A, the lens driving device 10 is formed in the shape of a cuboid in appearance, and the unshown lens is mounted at the central part of the lens driving device. The lens driving device 10 includes a lens carrier 11, a base 12, an electromagnetic drive mechanism 18 for swinging the lens or driving the lens to focus on the object to be shot, a front side spring component 15A, a back side spring component 15B and four connecting components 16.

The lens carrier 11 is formed in the shape of a square cylinder, and a cylindrical opening is defined in the central part of the lens carrier 11 along the Z direction. The electromagnetic drive mechanism 18 includes four driving coils 18C mounted on the outer peripheral sides of the lens carrier 11 and four driving magnets 18M mounted on the inner peripheral side of the magnet support 17M. The driving coils 18C include a driving coil 18C1 mounted on the +X side of the lens carrier 11, a driving coil 18C2 mounted on the −X side of the lens carrier 11, a driving coil 18C3 mounted on the +Y side of the lens carrier 11 and a driving coil 18C4 mounted on the −Y side of the lens carrier 11, each of which is formed in annular plate-shaped. The driving coils 18C1 to 18C4 are wound in a square ring shape around the radial direction of the lens carrier 11.

The cuboid-shaped driving magnets 18M are configured on the outer side of the winding surfaces of the driving coils 18C. The driving coils 18C and the driving magnets 18M are isolated along the radial direction and are arranged opposite to each other. Four driving magnets 18M are maintained on the inner side of the square frame-shaped magnet support 17M at 90-degree intervals. The back side end part of the coil support 17M is connected with the edge part 12b of the base 12.

The front side spring component 15A is arranged on the +Z side of the lens carrier 11, and the back side spring component 15B is arranged on the −Z side of the lens carrier 11.

The front side spring component 15A is integrally formed in the shape of a square frame, and includes a square inner side maintaining part 15a with a circular opening defined in the central part, linear wrist parts 15c which extend along the X direction and the Y direction and are formed on the outer side of the inner side maintaining part 15a, first connecting parts 15d for connecting the wrist parts 15c with the inner side maintaining part 15a at the central part of each wrist part, and second connecting parts 15e for connecting the end parts of the wrist parts 15c at four corners of the front side spring component 15A.

The back side spring component 15B is integrally formed in the shape of a square frame, and includes an annular square outer side maintaining part 15b in the shape of the square frame, wrist parts 15c which extend along the X direction and the Y direction and are formed on the inner side of the outer side maintaining part 15b, third connecting parts 15f for connecting the wrist parts 15c with the outer side maintaining part 15b at the central part of each wrist part, and second connecting parts 15e for connecting the end parts of the wrist parts 15c at four corners.

The inner side maintaining part 15a of the front side spring component 15A is connected with the front surface of the lens carrier 11. The outer side maintaining part 15b of the back side spring component 15B is connected with the edge part 12b of the base 12. The second connecting parts 15e of the front side spring component 15A are connected with the second connecting parts 15e of the back side spring component 15B through the connecting components 16. The connecting components 16 are cylindrical components, and there are four connecting components 16 arranged in the example. The connecting components 16 are positioned at four corners of the inner side of the magnet support 17M, and extend along the Z direction between the driving magnets 18M and the magnet support 17M. The front side end parts of the connecting components 16 are connected with the second connecting parts 15e of the front side spring component 15A, and the back side end parts of the connecting components 16 are connected with the second connecting parts 15e of the back side spring component 15B.

Thus, the lens carrier 11 is supported in the suspension manner relative to the base 12 by utilizing the wrist parts 15c of the back side spring component 15B and the wrist parts 15c of the front side spring component 15A which are connected with each other through the connecting components 16.

When current in the same direction flows in the driving coil 18C1 and the driving coil 18C2, same lorentz force in the Z direction is generated by the driving coil 18C1 and the driving coil 18C2 respectively, so that the lens carrier 11 straightly moves towards the Z direction. Moreover, when currents in opposite directions flow in the driving coil 18C1 and the driving coil 18C2 respectively, mutually converse lorentz forces in the Z direction are generated by the driving coil 18C1 and the driving coil 18C2 respectively so that the lens carrier 11 rotates around the Y axis. Namely, as shown in FIG. 5A, under the initial state that the driving coils 18C are not electrified, the second connecting parts 15e of the front side spring component 15A is positioned on the +Z side of the second connecting parts 15e of the back side spring component 15B.

On the other hand, as shown in FIG. 5B, when currents in opposite directions flow in the driving coil 18C1 and the driving coil 18C2 respectively, mutually converse lorentz forces in the Z direction are generated by the driving coil 18C1 and the driving coil 18C2 respectively so that the lens carrier 11 rotates around the Y axis.

Namely, when currents in opposite directions flow in the driving coil 18C1 and the driving coil 18C2 respectively, mutually converse lorentz forces in the Z direction are generated by the driving coil 18C1 and the driving coil 18C2 mounted on the lens carrier 11. Under the lorentz forces, the second connecting parts 15e of the front side spring component 15A moves towards the +X direction, the second connecting parts 15e of the back side spring component 15B moves towards the −X direction, S-shaped deflection occurs on the wrist parts 15c of the front side spring component 15A and the back side spring component 15B respectively, and the connecting components 16 are inclined towards the X direction, so that the lens carrier 11 rotates and swings around the Y axis. Moreover, when the currents in opposite directions to the above mentioned currents flow in the driving coil 18C1 and the driving coil 18C2, the lens carrier 11 rotates and swings around the Y axis in an opposite direction to the above mentioned direction.

Moreover, as shown in FIG. 5C, when currents in the same direction flow in the driving coil 18C1 and the driving coil 18C2 respectively, lorentz force in the same Z direction is generated by the driving coil 18C1 and the driving coil 18C2 mounted on the lens carrier 11. Under the lorentz force, the second connecting parts 15e of the front side spring component 15A moves towards the +Z direction, and C-shaped deflection occurs on the respective wrist parts 15c of the front side spring component 15A and the back side spring component 15B, so that the lens carrier 11 straightly moves towards the Z direction. Moreover, when currents in the same direction opposite to that mentioned above flow in the driving coil 18C1 and the driving coil 18C2 respectively, the lens carrier 11 straightly moves towards the −Z direction.

Moreover, similarly, if the current in the same direction flows in the driving coil 18C3 and the driving coil 18C4 respectively, the lens carrier 11 straightly moves towards the Z direction. If the mutually converse currents flow in the driving coil 18C1 and the driving coil 18C2 respectively, the lens carrier 11 rotates and swings around the X axis.

Thus, in the lens driving device 10 of the second embodiment of the present invention, the lens carrier 11 performing focus action or swing action is light in weight, and the inertia mass is reduced, and the lens driving device is no longer needed to swing a whole auto focus unit, like the auto focus unit 50 of the lens driving device 69 as shown in FIG. 6.

Moreover, corresponding to movements or rotations of the lens carrier 11 in the directions of X, Y and Z due to external force, the S-shaped or C-shaped deflection deformation with allowance easily occurs in elastic ranges respectively on the wrist parts 15c of the front side spring component 15A and the wrist parts 15c of the back side spring component 15B. Thus, the wrist parts 15c of the front side spring component 15A and the back side spring component 15B elastically deform with allowance and are difficult to suffer from the damage of buckling or breakage, and thus the functions of auto focus and swing can be relatively stable. Moreover, the inertia mass can be reduced furthermore, and impact force such as falling is weakened.

Thus, according to the present invention, even if the lens driving device 10 suffers from impact force, the front side spring component 15A and the back side spring component 15B elastically deform to a certain extent, and thus the front side spring component 15A and the back side spring component 15B are difficult to damage, and the functions of auto focus and shaking correction can be maintained stable. Moreover, if the magnets 13M are mounted on the side of the lens carrier 11, and the coil 13C is mounted on the side of the base 12, the lens carrier 11 can move towards the optical axis direction of the lens. Moreover, if the coils 14C are mounted on the side of the base, and the magnets 14M are mounted on the side of the lens carrier 11, the lens carrier 11 straightly swings towards the direction orthogonal with the optical axis of the lens. Moreover, the magnets 13M are set to play the two roles of focus and swing at the same time, the lens driving device 10 can be miniaturized, and the component cost can be reduced.

Moreover, if the driving coils 18C are mounted on the side of the lens carrier 11, and the driving magnets 18M are mounted on the side of the base 12, the lens carrier 11 can move towards the optical axis direction of the lens, and the lens carrier 11 can also rotate and swing towards the direction forming the right angle with the axis of the lens. And then, the driving coils 18C and the driving magnets 18M are set to play the two roles of auto focus and shaking correction, so that the lens driving device 10 can be miniaturized and light in weight, and the component cost is reduced.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A lens driving device, comprising:
   a lens carrier configured for maintaining a lens;
   a base configured for supporting the lens carrier;
   a first electromagnetic drive mechanism configure for driving the lens to focus on an object to be shot;
   a second electromagnetic drive mechanism configured for swinging the lens; and
   a front side spring component and a back side spring component both extending along a peripheral direction of the lens;
   wherein the first electromagnetic drive mechanism and the second electromagnetic drive mechanism are mounted between the lens carrier and the base;
   wherein one of the front side spring component and the back side spring component is connected with the lens carrier, the other of the front side spring component and the back side spring component is connected with the base, and the front side spring component and the back side spring component are connected with each other through a plurality of connecting components.

2. The lens driving device according to claim 1, wherein the first electromagnetic drive mechanism comprises a focus coil configured on a side of the base and a plurality of first magnets configured on a side of the lens carrier which is movable with respect to the side of the base; the second electromagnetic drive mechanism comprises a plurality of coils configured for swinging the lens and mounted on the side of the base and a plurality of second magnets also configured on the side of the lens carrier.

3. The lens driving device according to claim 2, wherein the plurality of first magnets also serves as the second magnets.

4. The lens driving device according to claim 1, wherein the first electromagnetic drive mechanism and the second electromagnetic drive mechanism comprise a plurality of driving coils mounted on a side of the lens carrier which is movable with respect to the side of the base and a plurality of driving magnets mounted on a side of the base.

5. The lens driving device according to claim 1, wherein the first electromagnetic drive mechanism comprises a focus coil configured on a side of the base and a plurality of magnets configured on a side of the lens carrier which is movable with respect to the side of the base; the second electromagnetic drive mechanism comprises a plurality of coils configured for swinging the lens and mounted on the side of the base and the plurality of magnets.

\* \* \* \* \*